United States Patent
Eizips et al.

(10) Patent No.: US 11,437,820 B2
(45) Date of Patent: Sep. 6, 2022

(54) SYSTEMS AND METHODS FOR QUICK DISSIPATION OF STORED ENERGY FROM INPUT CAPACITORS OF POWER INVERTERS

(71) Applicant: Tigo Energy, Inc., Campbell, CA (US)

(72) Inventors: Daniel Eizips, Sunnyvale, CA (US); Mordechay Avrutsky, Alfei Menashe (IL); Sergey Kondrashov, Los Gatos, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 0 days.

(21) Appl. No.: 16/841,408

(22) Filed: Apr. 6, 2020

(65) Prior Publication Data
US 2020/0235583 A1 Jul. 23, 2020

Related U.S. Application Data

(63) Continuation of application No. 15/159,699, filed on May 19, 2016, now Pat. No. 10,615,607.

(Continued)

(51) Int. Cl.
H02J 3/38 (2006.01)
H02M 3/158 (2006.01)
H02M 1/32 (2007.01)

(52) U.S. Cl.
CPC ............ *H02J 3/38* (2013.01); *H02M 3/1582* (2013.01); *H02M 1/322* (2021.05); *Y02E 10/56* (2013.01)

(58) Field of Classification Search
CPC ........ H02J 3/38; H02M 3/1582; H02M 1/322; Y02E 10/56

(Continued)

(56) References Cited

U.S. PATENT DOCUMENTS 10,615,607 B2   4/2020  Eizips et al.
2004/0125618 A1* 7/2004  De Rooij ............ H02M 7/4807
                                              363/17

(Continued)

FOREIGN PATENT DOCUMENTS

WO      2014062168 A1     4/2014
WO   WO-2014062168 A1 *   4/2014  ............... G05F 1/67

OTHER PUBLICATIONS

International Patent Application PCT/US2016/033478, International Search Report and Written Opinion, dated Aug. 23, 2016.

(Continued)

*Primary Examiner* — Alfonso Perez Borroto
(74) *Attorney, Agent, or Firm* — Greenberg Traurig

(57) ABSTRACT

Methods and systems for connecting a photovoltaic module and an inverter having an input capacitor are presented. The photovoltaic system includes a maximum power point tracking (MPPT) controller coupled between the inverter and the photovoltaic module. The MPPT controller includes a direct current (DC) converter configured to reduce, in a forward buck mode, a voltage of the photovoltaic module, to supply power from the photovoltaic module to the input capacitor of the inverter. The photovoltaic system also includes a microcontroller unit (MCU) configured to control the DC converter to allow the photovoltaic module to operate at a maximum power point, and to increase, in a reverse boost mode, a voltage of the input capacitor of the inverter, to dissipate power from the input capacitor in the photovoltaic module, and the MPPT controller is configured to, based upon one or more triggers.

17 Claims, 9 Drawing Sheets

Related U.S. Application Data

(60) Provisional application No. 62/165,672, filed on May 22, 2015.

(58) Field of Classification Search
USPC .......................................................... 307/71
See application file for complete search history.

(56) References Cited

U.S. PATENT DOCUMENTS

| | | | |
|---|---|---|---|
| 2006/0132102 A1 | 6/2006 | Harvey | |
| 2009/0284998 A1* | 11/2009 | Zhang | G05F 1/67 363/55 |
| 2011/0012430 A1* | 1/2011 | Cheng | H02J 3/383 307/82 |
| 2011/0134668 A1* | 6/2011 | Cho | G05F 1/67 363/78 |
| 2011/0160930 A1* | 6/2011 | Batten | H02J 3/386 700/298 |
| 2012/0253541 A1 | 10/2012 | Arditi et al. | |
| 2013/0002031 A1* | 1/2013 | Mulkey | H02J 3/381 307/82 |
| 2013/0181736 A1* | 7/2013 | Gostein | G01R 15/146 324/761.01 |
| 2014/0211529 A1* | 7/2014 | Kandasamy | H02J 3/381 363/131 |
| 2014/0233286 A1* | 8/2014 | Adest | H02M 3/04 363/95 |
| 2014/0333135 A1 | 11/2014 | Hargis et al. | |
| 2015/0137606 A1* | 5/2015 | Adest | H02J 3/381 307/77 |
| 2015/0137609 A1* | 5/2015 | Gazit | H02J 1/00 307/83 |
| 2016/0344192 A1 | 11/2016 | Eizips et al. | |

OTHER PUBLICATIONS

Wikipedia, Boost Converter, https://en.wikipedia.org/wiki/Boost_converter, last modified on Mar. 22, 2016, retrieved an Jun. 1, 2016.
Wikipedia, Buck Converter, https://en.wikipedia.org/wiki/Buck_converter, last modified on Apr. 16, 2016, retrieved on May 31, 2016.

* cited by examiner

SYSTEMS AND METHODS FOR QUICK DISSIPATION OF STORED ENERGY FROM INPUT CAPACITORS OF POWER INVERTERS

CROSS-REFERENCE TO RELATED APPLICATIONS

The present application is a continuation application of U.S. patent application Ser. No. 15/159,699, filed May 19, 2016, entitled "Systems and Methods for Quick Dissipation of Stored Energy from Input Capacitors of Power Inverters", which claims the benefit of the filing date of Provisional U.S. Pat. App. Ser. No. 62/165,672, filed May 22, 2015, entitled "Systems and Methods for Quick Dissipation of Stored Energy from Input Capacitors of Power Inverters during Emergency Shutdown of Photovoltaic Systems", the entire disclosures of which applications are hereby incorporated herein by reference.

The present application relates to U.S. Pat. Pub. No. 2014/0327313, filed Apr. 23, 2014 and entitled "System and Method for Low-Cost, High-Efficiency Solar Panel Power Feed," which claims the benefit of the filing date of Provisional U.S. Patent Application Ser. No. 61/818,036, filed May 1, 2013 and entitled "System and Method for Low-Cost, High-Efficiency Solar Panel Power Feed," the disclosures of which applications are incorporated herein by reference. The present application further relates to U.S. Patent Application Publication No. 2013/0026840, filed on Jan. 9, 2012 and entitled "Systems and Methods to Reduce the Number and Cost of Management Units of Distributed Power Generators," and U.S. Pat. No. 8,314,375, issued on Nov. 20, 2012 and entitled "System and Method for Local String Management Unit," the entire disclosures of which applications or patents are hereby incorporated herein by reference.

BACKGROUND

Field of the Disclosure

The present disclosure is related to photovoltaic systems in general, and more particularly to the safety-enhancing modules for quickly discharging capacitors in photovoltaic systems.

Description of Related Art

Photovoltaic systems are becoming increasingly common for power generation. Photovoltaic systems are safe, clean sources of power, which function reliably and last many years once installed. The use of these systems is only expected to grow in the future as the costs of these systems continues to decrease, and alternative energy resources are implemented in the energy economy.

In a case of fire or other emergency, when any electrical power generation or distribution system must be shut down quickly, there are known electrical hazards associated with electrical power generation and distribution systems. Thus, safety systems form an important part of electrical power generation and distribution systems to account for this, and there are methods and systems known for de-energizing traditional electrical power systems during emergencies. However, photovoltaic systems present some unique difficulties, which are not adequately resolved by conventional safety systems.

BRIEF SUMMARY

One embodiment of the disclosure is drawn to a photovoltaic system connected to an inverter having an input capacitor. The photovoltaic system includes at least one photovoltaic module and a maximum power point tracking (MPPT) controller coupled between the input capacitor of the inverter and the at least one photovoltaic module. The MPPT controller includes a direct current (DC) converter configured to reduce, in a forward buck mode, a voltage of the at least one photovoltaic module, to supply power from the at least one photovoltaic module to the input capacitor of the inverter.

The photovoltaic system also includes a microcontroller unit (MCU) configured to control the DC converter to allow the at least one photovoltaic module to operate at a maximum power point. The DC converter is software-configurable to increase, in a reverse boost mode, a voltage of the input capacitor of the inverter, to dissipate power from the input capacitor in the at least one photovoltaic module, and the MPPT controller is configured to, based upon one or more triggers, automatically change the DC converter from the forward buck mode to the reverse boost mode to dissipate energy stored in the input capacitor of the inverter.

One embodiment of the disclosure is drawn to a system connecting at least one photovoltaic module to an inverter having an input capacitor. The system includes a maximum power point tracking (MPPT) controller coupled between the input capacitor of the inverter and the at least one photovoltaic module. The MPPT controller includes a direct current (DC) converter configured to reduce, in a forward buck mode, a voltage of the at least one photovoltaic module, to supply power from the at least one photovoltaic module to the input capacitor of the inverter.

The system also includes a microcontroller unit (MCU) configured to control the DC converter to allow the at least one photovoltaic module to operate at a maximum power point. The DC converter is software-configurable to increase, in a reverse boost mode, a voltage of the input capacitor of the inverter, to dissipate power from the input capacitor in the at least one photovoltaic module, and the MPPT controller is configured to, based upon one or more triggers, automatically change the DC converter from the forward buck mode to the reverse boost mode to dissipate excess energy stored in the input capacitor.

One embodiment of the disclosure is drawn to a method for transferring energy between at least one photovoltaic module and an inverter having an input capacitor. The method includes coupling a maximum power point tracking (MPPT) controller between the input capacitor of the inverter and the at least one photovoltaic module. The MPPT controller includes a direct current (DC) converter configured to reduce, in a forward buck mode, a voltage of the at least one photovoltaic module, to supply power from the at least one photovoltaic module to the input capacitor of the inverter, and a microcontroller unit (MCU) configured to control the DC converter to allow the at least one photovoltaic module to operate at a maximum power point. The DC converter is software-configurable to increase, in a reverse boost mode, a voltage of the input capacitor of the inverter, to dissipate power from the input capacitor in the at least one photovoltaic module.

The method also includes bucking, as controlled by the MCU, the voltage of the at least one photovoltaic module to the inverter via the DC converter in the forward buck mode to supply power to the input capacitor of the inverter, monitoring, by the MCU, one or more triggers for an emergency shutdown condition, and changing, as controlled by the MCU, upon a determination by the MCU from the monitoring that an emergency shutdown condition has been met, the DC converter from the forward buck mode to the reverse boost mode.

BRIEF DESCRIPTION OF THE DRAWINGS

A more complete appreciation of the disclosed embodiments and many of the attendant advantages thereof will be more readily obtained by reference to the accompanying drawings when considered in connection with the following detailed description.

DETAILED DESCRIPTION

The following descriptions are meant to further clarify the present disclosure by giving specific examples and embodiments. These embodiments are meant to be illustrative rather than exhaustive. The full scope of the disclosure is not limited to any particular embodiment disclosed in this specification, but rather is defined by the dependent claims.

In view of the above, a system and method that, in the case of an emergency shutdown, shuts down not only the panels, but also provides for a safe and quick dissipation of the energy stored on the input capacitors of the inverter is needed. This renders the solar wiring safe for people to accidentally touch, without any bodily harm.

Figure 1:
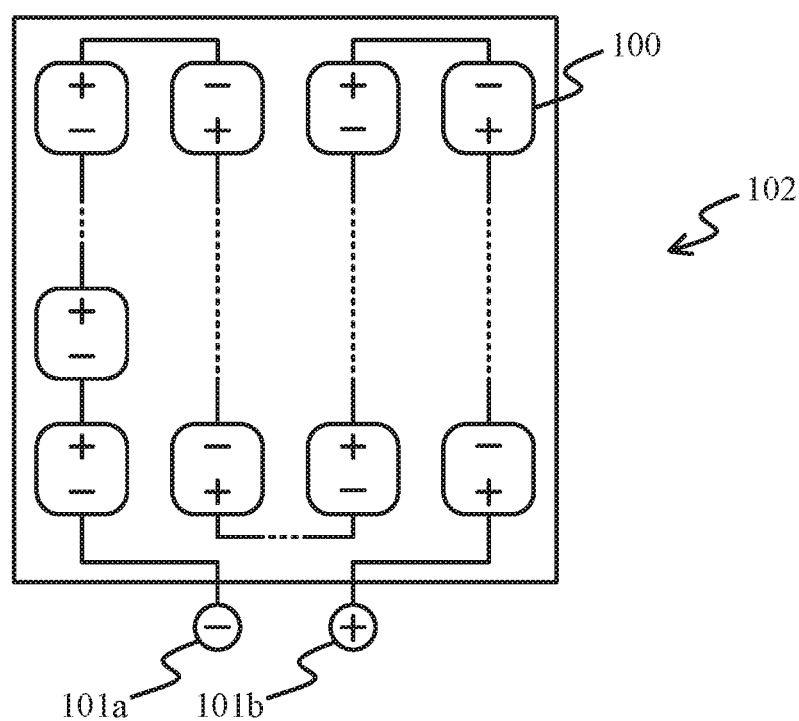
FIG. 1 is a schematic structural diagram illustrating photovoltaic cells in a photovoltaic module according to some embodiments of the present disclosure.

FIG. 1 is a schematic structural diagram illustrating photovoltaic cells in a photovoltaic module according to some embodiments of the present disclosure.

A typical photovoltaic (PV) system includes photovoltaic cells 100, or solar cells, which absorb light and convert the energy of the light into electricity via the photovoltaic effect. The PV cells 100 are connected in series and/or in parallel in PV modules 102, or solar modules, in order to produce a desired voltage and current. Solar modules 102 may then also be connected in series and in parallel, using output terminals 101a and 101b, according to the desired output characteristics of the PV system. A PV system tied to an electrical grid, for example, will typically have different output requirements than a stand-alone PV system for charging a battery.

Figure 2:
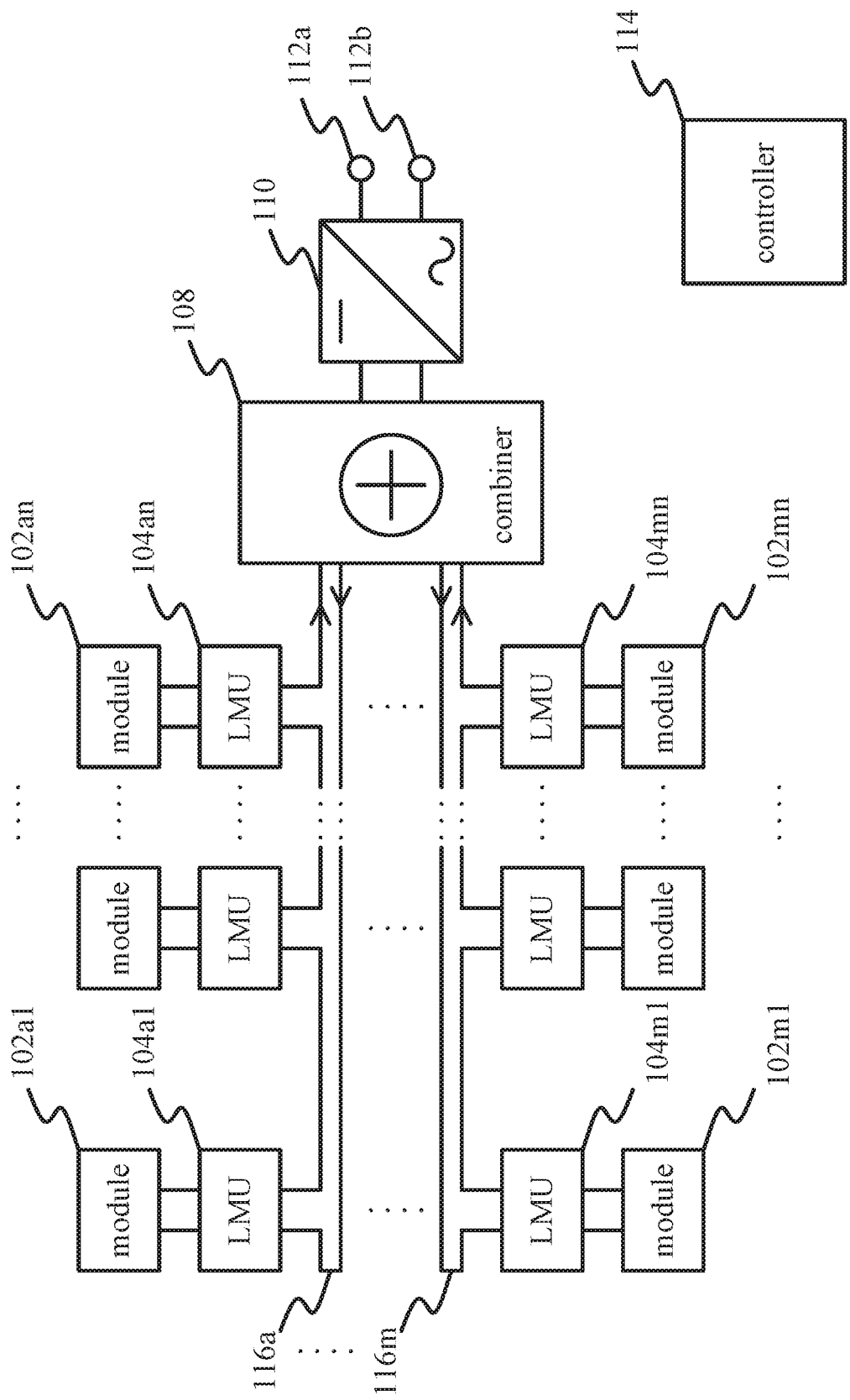
FIG. 2 is a schematic structural diagram illustrating strings of photovoltaic modules in a photovoltaic array according to some embodiments of the present disclosure.

FIG. 2 is a schematic structural diagram illustrating strings of photovoltaic modules in a photovoltaic array according to some embodiments of the present disclosure.

Solar modules 102a1 through 102mn are usually mounted on panels, which may each hold one or more solar modules. A group of solar modules 102a1 through 102an connected together is also called a string of solar modules. Strings of solar modules are usually wired in series via a "string" or power bus 116a through 116m to produce a required output voltage. Strings which are too small will sacrifice efficiency; strings which are too large can damage other equipment in the PV system, such as inverters, void equipment warranties, or violate local electrical codes. A PV array, or solar array, may contain multiple strings 116a through 116m of solar modules 102a1 through 102mn.

Solar modules 102a1 through 102mn may be connected to the strings 116a through 116m via local management units (LMUs) 104a1 through 104mn, respectively. The LMUs may also be referred to as solar module controllers, solar module converters, or link module units. The LMUs may be used to switch the solar modules 102a1 through 102mn on and off periodically to improve the energy production performance of photovoltaic array. The LMUs may include a solar module controller to control the operation of the solar module, to monitor a status of the solar module, and to link the solar module to the serial power bus for energy delivery. The LMUs may also perform filtering and DC conversion, e.g., to buck or boost a module output voltage to a desired string voltage, of the power output by their respective solar modules to the strings.

In some embodiments, the LMUs 104a1 through 104mn may use the power bus for sending data and communications. In some embodiments, the LMUs may be connected to a separate communication network, either via wires or wirelessly. In some embodiments, the LMUs may use the power bus and one or more of a wired or wireless network for sending data and communications. In some embodiments, an LMU may be configured to operate more than one solar module. For example, an LMU could be configured to operate each solar panel in a solar array, where each solar panel included two or more solar modules.

The LMUs 104a1 through 104mn may be connected on one side to the solar modules 102a1 through 102mn in parallel, and on the other side in series to strings 116a through 116m. The LMUs may receive different types of input communications, for example, a requested duty cycle, which can be expressed as a percentage (e.g., from 0% to 100%) of time the solar module is to be connected to the serial power bus, a phase shift in degrees (e.g., from 0 degrees to 180 degrees), and a timing or synchronization pulse. These inputs can be supplied, for example, as discrete signals, or can be supplied as data on a network, or composite signals sent through the power lines 116a to 116m, or wirelessly, and in yet other cases, as a combination of any Rof these input types.

In some embodiments, the LMUs 104a1 through 104mn may also monitor a status of the solar modules 102a1 through 102mn, for example, by monitoring sensors which give operating parameters of the module such as voltage, current, temperature, and the like. In some embodiments, the LMUs 104a1 through 104mn may also monitor local meteorological conditions, for example, such as solar irradiance, air temperature, and the like. The LMUs may be configured to optimize an operation of their respective solar module using the status of the solar module determined by the monitoring.

In some embodiments, the LMUs can shut down the solar module based on one or more triggers determined by the monitoring, for example, an overvoltage, a high temperature, or the like, or based on an emergency shutdown signal received from the controller 114. In some embodiments, the controller may output a system OK signal, and the LMUs shut down their respective solar module if the system OK signal is not received for a predetermined period of time, for example, 10 seconds.

In some embodiments, the LMUs 104*a*1 through 104*mn* may communicate the status of the solar modules 102*a*1 through 102*mn* and local meteorological conditions to a controller 114. The controller 114 may then determine and generate the input communications for driving the LMUs, for example, a duty cycle, a phase shift, or a timing or synchronization pulse, based at least in part on the statuses of the solar modules and the meteorological conditions to optimize a performance of the solar array.

In some embodiments, the controller 114 can cause the LMUs 104*a*1 through 104*mn* to shut down their respective solar module based on one or more triggers determined by the monitoring, for example, an overvoltage, a high temperature, or the like, or based on an emergency shutdown signal generated by and sent from the controller 114. The controller 114 generates and sends the emergency shutdown signal, which may be based on an overvoltage in a combiner or an inverter, a condition at connectors 112*a* and 112*b*, for example, to a mains power grid or local system, or an external factor, such as a fire alarm, seismic alarm, or the like. In some embodiments, the controller may generate and output a system OK signal, and the LMUs shut down their respective solar module automatically if the system OK signal is not received for a predetermined period of time, for example, 10 seconds.

The strings 116*a* through 116*m* are collected in combiner 108. The combiner 108 collects the DC power from the strings 116*a* through 116*m* and supplies DC power to a central inverter 110. The inverter 110 may have filters and capacitors on the input side. A capacitance of the central inverter 110 varies by application; however, in general, there is a very large capacitance on the input side of an inverter in solar energy applications. Even when the system is shut-down, for example, when a power grid to which the solar array is supplying energy is shutdown, a problem remains that the capacitors on the input side of the central inverter may still be holding a dangerous amount of charge.

The controller 114 may include a microcontroller or small single chip microcontroller (SCMC), for example, or may be implemented using an Application-Specific Integrated Circuit (ASIC), Field-Programmable Gate Array (FPGA), or other programmable logic. The controller 114 can even be implemented in discrete, functionally equivalent circuitry, or in other cases a combination of SCMC and discrete circuitry.

The controller 114 may be a stand-alone unit, or may be integrated with the combiner 108, with the inverter 110, or with both the combiner and the inverter into a single unit. In some embodiments, the controller 114 is integrated with the inverter 100, monitors a performance of the inverter, determines and tracks a maximum power point, and controls the LMUs 104*a*1 through 104*mn* based on, at least in part, the maximum power point. Further, while depicted as a logical unit for purposes of this disclosure, the controller 114 may be a distributed device.

For example, the controller 114 could include maximum power point tracking (MPPT) circuitry integrated with inverter 110, local control circuitry integrated with LMUs 104*a*1 through 104*mn* or with the individual solar modules 102*a*1 through 102*mn*, and a stand-alone microcontroller unit (MCU) which communicates with and controls the MPPT and local circuit elements. The MPPT calculations by the MCU may be performed, for example, using one or more known MPPT algorithms such as perturb-and-observe, incremental conductance, current sweep, or constant voltage. The MPPT algorithms find the operating voltage that allows a maximum power output from the inverter. The controller 114 could also include multiple controllers, for example, with each controller being responsible for a string, or for one or more solar modules on a solar panel.

The embodiment of FIG. 2 is a common arrangement of a photovoltaic solar array system, wherein the solar modules 102*a*1 through 102*mn* supply DC power to the strings 116*a* through 116*m*. The power is collected by the combiner 108, and then supplied to the inverter 110. While this is one arrangement with which the teachings of the present disclosure may be practiced, it is not the only such arrangement.

Figure 3A:
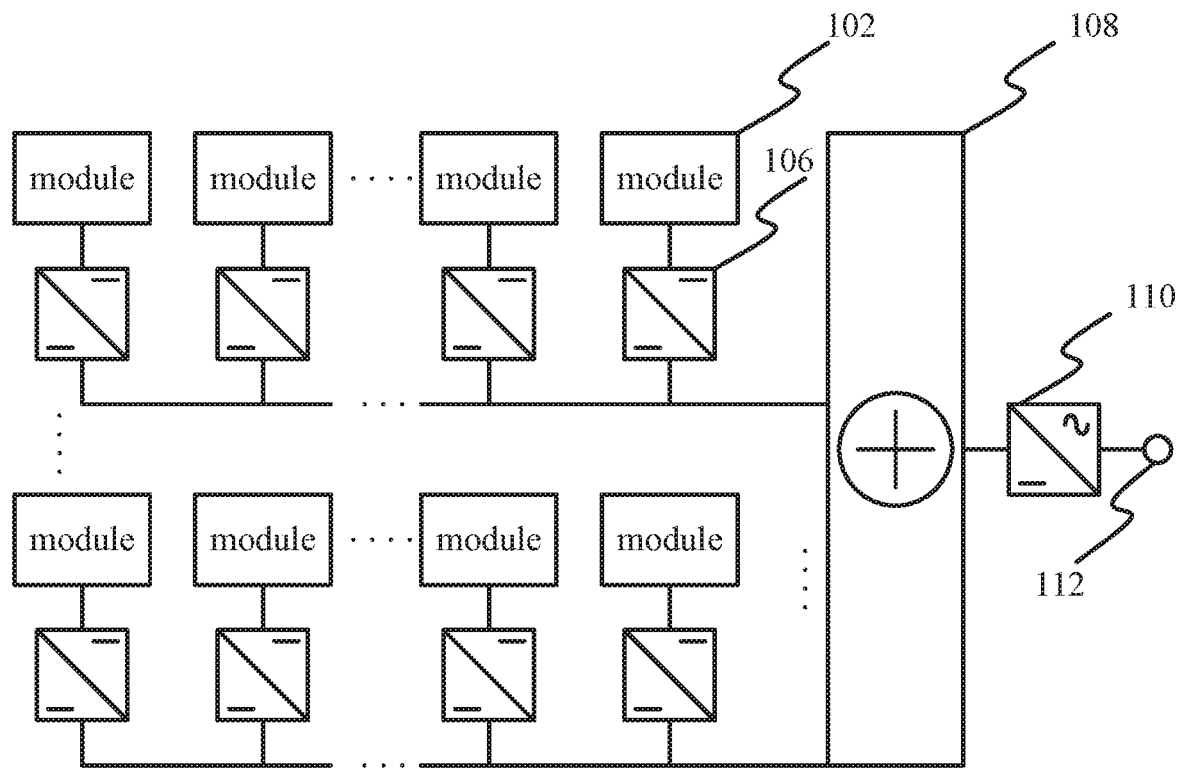
FIGS. 3A-3C are schematic structural diagrams illustrating different inverter locations in photovoltaic arrays according to some non-limiting embodiments of the present disclosure.
Figure 3B:
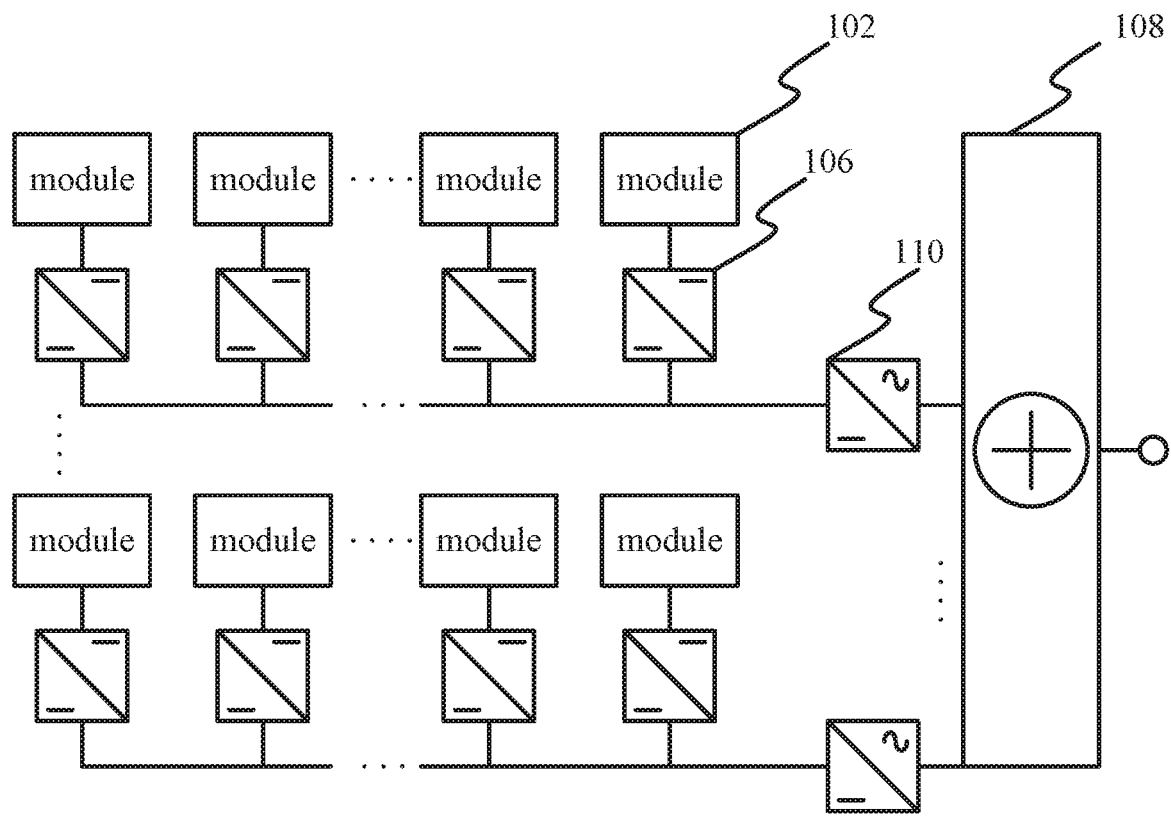
Figure 3C:
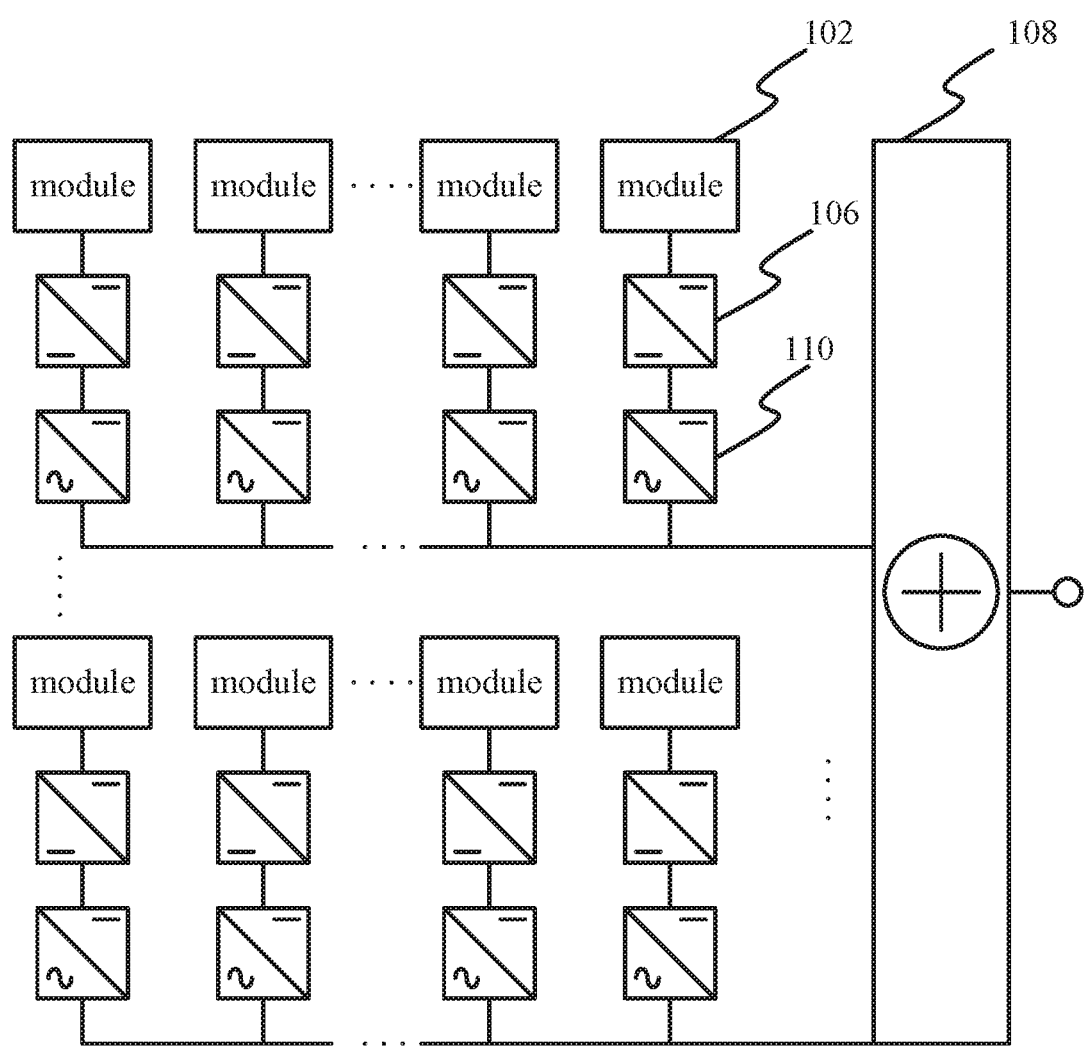

FIGS. 3A-3C are schematic structural diagrams illustrating different inverter locations in photovoltaic arrays according to some non-limiting embodiments of the present disclosure. FIG. 3A is a schematic structural diagram of an arrangement similar to FIG. 2, where DC converters 106 convert the solar module output voltage to a desired string voltage. DC power is carried by the strings to combiner 108, and there is a single central inverter 110 for the solar array which outputs AC power to terminal 112. An implementation using a central inverter as in FIG. 3 simple and reliable, but since it effectively treats the whole solar array as a single may not allow the best optimization of the solar array's output power by MPPT.

FIG. 3B is a schematic structural diagram of an arrangement where DC converters 106 also convert the solar module output voltage to a desired string voltage, but there is a string inverter 110 on each string. The outputs of the string inverters 110 are then added in combiner 108 which outputs AC power from the solar array. String inverters represent a middle ground between the simplicity of a single central inverter and the ability to better optimize the solar array's output power by controlling the strings individually by MPPT.

FIG. 3C is a schematic structural diagram of an arrangement where DC converters 106 convert the solar module output voltage to a desired voltage. There is a micro-inverter 110 connected between each DC converter 106 output and its respective string. The AC power of the strings is then added in combiner 108, which outputs AC power from the solar array. Micro-inverters allow the greatest flexibility for optimization of output power, but also require the most equipment.

The systems and methods disclosed below can be practiced in any of the configurations of FIGS. 2, 3A through 3C.

Figure 4A:
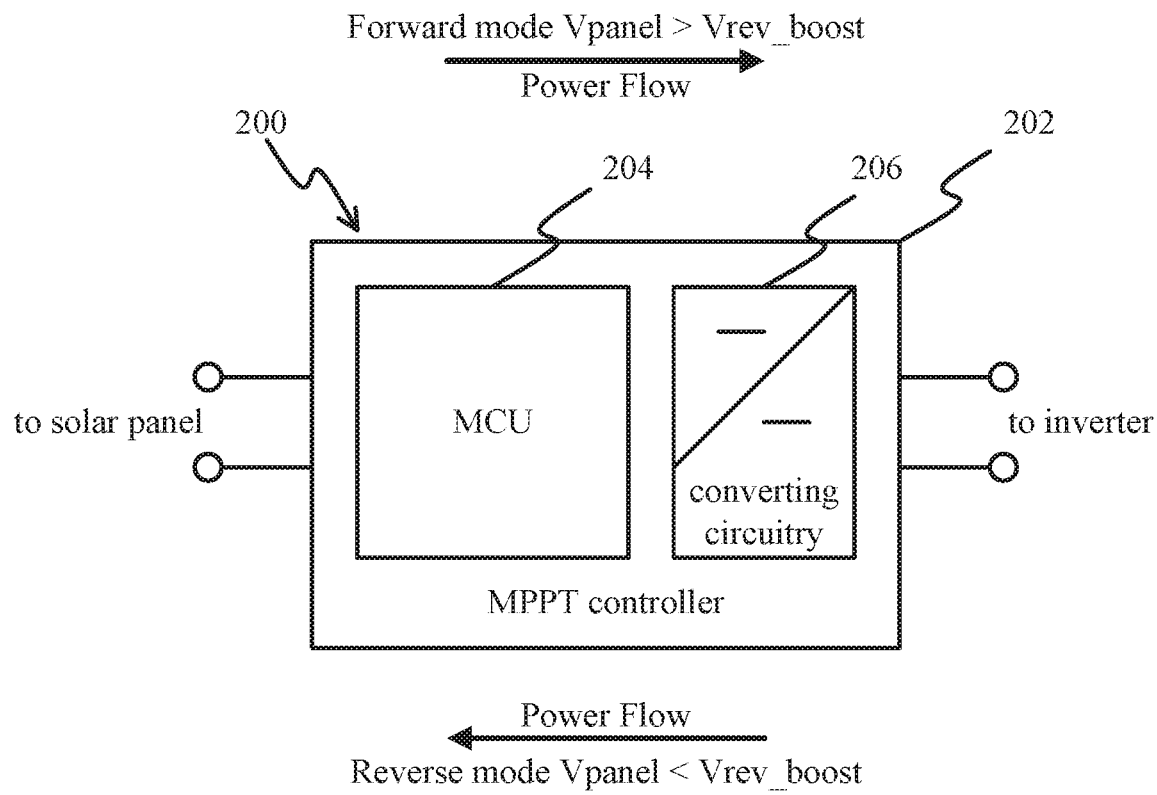
FIGS. 4A and 4B are schematic structural diagrams illustrating a power converting system including a maximum power point tracking (MPPT) controller according to some embodiments of the present disclosure.

FIG. 4A is a schematic structural diagram illustrating a power converting system according to some embodiments of the present disclosure. The power converting system 200 includes a maximum power point tracking (MPPT) controller 202, which is electrically coupled between at least one solar module and the input side of an inverter for the solar array. The embodiment of FIG. 4, as well as the other embodiments of the photovoltaic system described hereinbelow, can be applied to any of the solar array configurations of FIGS. 2, 3A through 3C, or any other solar array configuration, as long as the photovoltaic system may be coupled between a solar module and an input side of an inverter having capacitive elements.

The MPPT controller 202 includes microcontroller unit (MCU) 204 and DC converting circuitry 206. The MCU 204 may monitor the inverter performance, perform MPPT calculations, control the DC converting circuitry 206, and may be programmed to perform some or all of the calculations, control functions, and actions as described in this disclosure. The MCU 204 can be implemented in LMUs illustrated in FIG. 2 or DC converters 106 illustrated in FIGS. 3A-3C to send and receive signals from the controller 114, for example, via the strings or wireless communications, where the signals may include control signals such as emergency shutdown signals for the solar modules. In the power converting system 200 depicted as a unit in FIG. 4A, the DC converting circuitry 206 is electrically located between the at least one solar module and the respective inverter, while the MCU 204 can use the power from the solar panel to control the operation of the converting circuitry, and perform communications and/or calculations. In some embodiments, one or more components of the MPPT controller may be distributed throughout the solar array, with at least the DC converting circuitry being electrically located between the at least one solar module and the inverter.

Figure 4B:
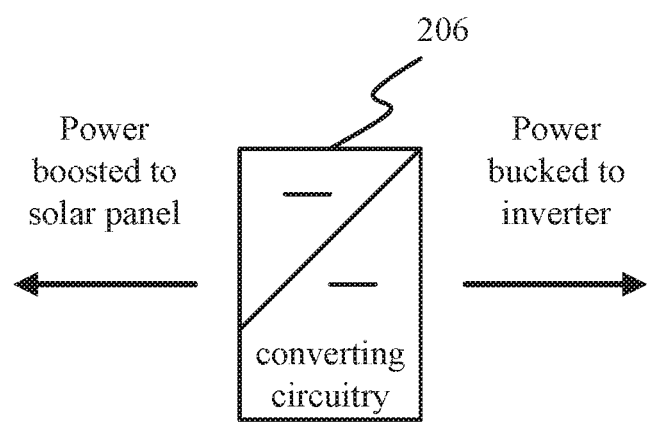

The DC converting circuitry 206 includes an efficient switched mode power converter with synchronous, or active, rectification. The active rectification may be efficiently accomplished using transistors, for example, MOSFETs, and synchronous switching in the DC converting circuitry 206 is controlled by the MCU 204. As shown in FIG. 4B, the DC converting circuitry performing active rectification in a synchronous mode may transfer power from the solar panel to the inverter in one forward mode, and from the inverter to the solar panel in a reverse mode.

In FIG. 4A, during the operation of the converting circuitry 206, a voltage (Vrev_boost) at the "to solar panel" terminals connected to the at least one solar module is greater than a voltage (Vinverter) at the "to inverter" terminals connected to the string/inverter. Thus, the DC converting circuitry 206 reduces, or "bucks," the voltage (Vrev_boost) from the at least one solar module side down to the voltage (Vinverter) at the inverter side. From a different point of view, the converting circuitry 206 increases, or "boosts", the voltage (Vinverter) at the inverter side to the voltage (Vrev_boost) to counter balance the voltage (Vpanel) from the solar panel. When the voltage (Vrev_boost) is less than the voltage (Vpanel), power flows from the solar panel to the inverter in the forward mode; and when the voltage (Vrev_boost) is greater than the voltage (Vpanel), power flows to the solar panel from the inverter in the reverse mode.

In general, the DC converting circuitry 206 may include, for example, a buck converter, a buck-boost converter, or a Ćuk converter. The DC converting circuitry 206 can operate in a way that the voltage (Vinverter) at the "to inverter" terminals may nor may not be smaller than the voltage (Vrev_boost) at the "to solar panel" terminals. For a given voltage (Vinverter) at the inverter side, the converting circuitry 206 can be controlled by MCU to either operate at a voltage (Vrev_boost) that is great than the voltage (Vpanel) from the solar panel and thus in the reverse mode, or a voltage (Vrev_boost) that is less than the voltage (Vpanel) from the solar panel and thus in the forward mode. The adjustment can be effectuated by changing the voltage conversion ratio, for example, by adjusting the control parameters (e.g., duty cycle) used by the MCU to control the converting circuitry.

Figure 7:
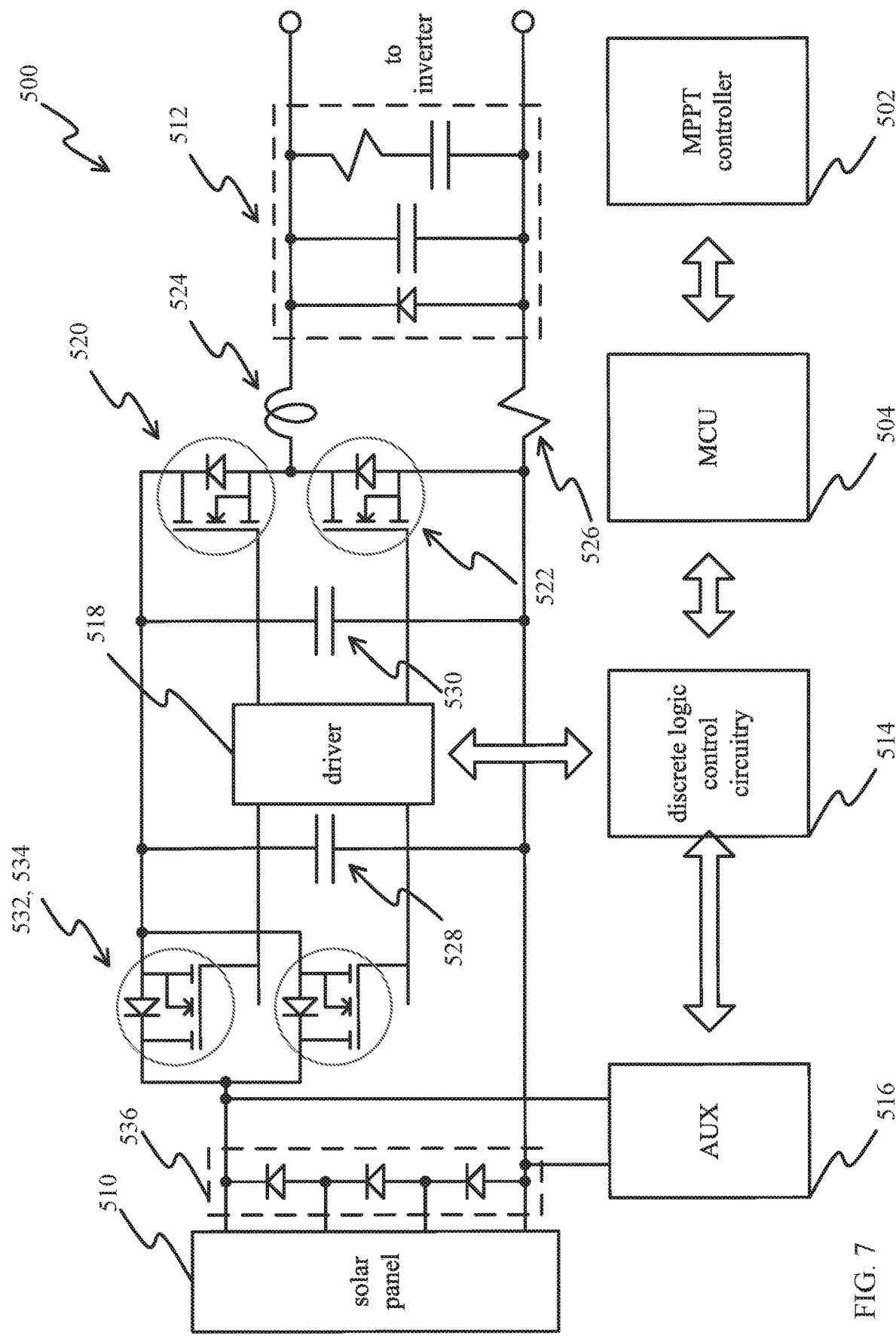
FIG. 7 is a schematic structural diagram illustrating a photovoltaic system including an MPPT controller according to some embodiments of the present disclosure.

For example, when the converting circuitry is a buck converter implemented with a synchronous rectifier (e.g., as illustrated in FIG. 7), the MCU 204 can control the duty cycle and the frequency of the synchronous switching operations in the DC converting circuitry 206 to change the voltage conversion ratio and thus control the direction in which power flows across the DC converting circuitry 206. The MCU 204 can control the DC converting circuitry 206 so that in a forward mode of the MPPT controller, the voltage on the solar panel is greater than the reverse boosted voltage from the DC converting circuitry 206. In the forward mode, power flows from the solar panel to the inverter. The MCU 204 can also control the DC converting circuitry 206 so that in a reverse mode of MPPT controller, the voltage on the solar panel is less than the reverse boosted voltage from the DC converting circuitry 206. In the reverse mode, power flows from the inverter to the solar panel, and is dissipated in the photodiodes of the at least one solar module. The DC converting circuitry 206 is software configurable, via the MCU 204 adjusting the duty cycle and/or switching frequency of the DC converting circuitry 206, to transition between the forward and reverse modes.

The system and method disclosed herein for synchronous rectification can be designed for a distributed algorithm and, as such, needs to behave in a manner that reflects to the inverter the correct direction for current, and thus power, to move. This behavior is achieved by having a low output impedance. This means that when voltage at the inverter side is forced above a threshold voltage, for example, a threshold of a so-called "smart" voltage, Vsmart, which is typically set to 6% greater than maximum power point voltage, Vmp, the MPPT controllers are used to transfer the energy into the PV panels. The maximum power point voltage, Vmp, is determined by the MCU using an MPPT algorithm.

In other cases, when the inverter takes the string and/or array voltage down (corresponding to different configurations from FIGS. 3A to 3C), or an overvoltage situation is detected, the photovoltaic system transfers this power to the correct MPPT controllers for the PV panels to dissipate, by running the elements as diodes in forward mode.

To achieve a synchronous operation of all connected MPPT controllers, an MPPT controller topology with both a forward and a reverse per pulse current limit is utilized. In addition, during a rapid shutdown, when inverter capacitors have to be discharged, the same mechanism as described above may be used. At this stage, any input over the disconnect voltage is increased by the MCU changing the MPPT controller into a boost converter. Normally, this phenomena happens at low power, so it does not justify another dedicated hardware-based circuit.

Optionally, the power converting system 200 connected to an inverter has an MPPT function as part of the string supplying current to the inverter from the photovoltaic panels. Further, this MPPT controller may contain a buck, or any other suitable topology, which when operated in synchronous mode can transfer energy from input to output or output to input. The DC converting circuitry is typically for reducing the voltage of the panels, but the disclosure is not limited to this case only. The photovoltaic system also has an MCU for communication and executing control programs controlling the buck converter, to enable the string to operate at the MPPT point, as determined by an MPPT algorithm for the string inverter. The buck converter is software-configurable, via the MCU, to operate as a reverse boost converter, enabling the system to draw energy out of the string and attached inverter and to dissipate energy in the photodiodes of the PV panel.

In some embodiments, the controller 204 may, based upon certain triggers, automatically change from operating the converting circuitry from the forward buck mode to the reverse boost mode to dissipate excess energy in the photodiodes of the PV panel. These certain triggers may be an overvoltage condition (i.e., an overvoltage relative to Vsmart), an emergency shutdown signal, or the absence of a system OK signal. Further, the transition between reverse boost and forward buck mode may occur using a soft start approach, avoiding a surge current, or the transition may occur on a pulse-by-pulse basis.

Figure 5:
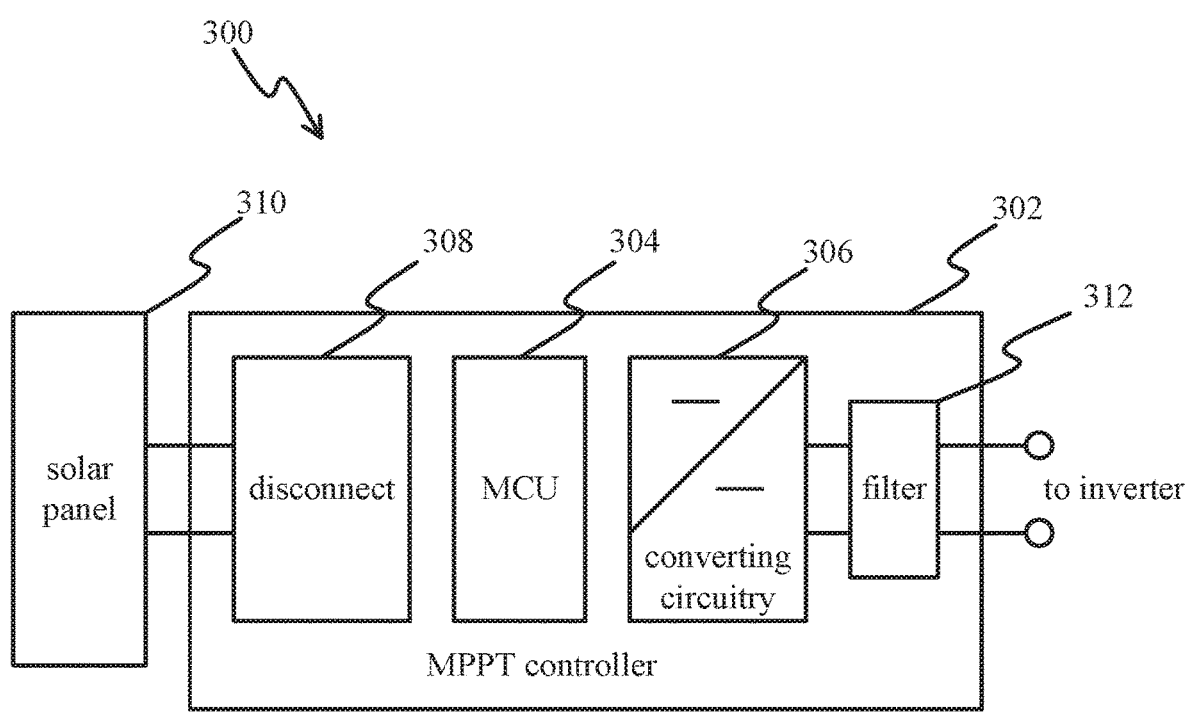
FIG. 5 is a schematic structural diagram illustrating a photovoltaic system including an MPPT controller according to some embodiments of the present disclosure.

FIG. 5 is a schematic structural diagram illustrating a photovoltaic system 300 for connecting to an inverter according to some embodiments of the present disclosure. The photovoltaic system 300 includes a solar panel 310 having one or more solar modules and an MPPT controller 302. The MPPT controller 302 is configured to perform all the functions and is substantially similar to the MPPT controller 202 described hereinabove. The MPPT controller 302 includes an MCU 304, DC converting circuitry 306, a disconnect 308, and filtering element 312. The MCU 304 and the DC converting circuitry 306 perform the same functions and are substantially similar to the MCU 204 and the DC converting circuitry 206 described hereinabove.

The filtering element 312 is disposed between the DC converting circuitry 306 and the inverter, or between the DC converting circuitry 306 and a string to the inverter. The filtering element 312 is configured to smooth and stabilize an output voltage. The filtering element 312 may include, for example, various combinations of capacitors, resistors, diodes, and the like, in series and in parallel.

The disconnect 308 is configured to disconnect the solar panel from the DC converting circuitry 306, and thus ultimately from the inverter. The disconnect 308 may include, for example, transistor switches, and may be controlled via the MCU 304.

The MPPT controller 304 may, based upon certain triggers, automatically change from the forward buck mode to the reverse boost mode to dissipate excess energy in the photodiodes of the PV panel. These certain triggers may be an overvoltage condition (i.e., an overvoltage relative to Vsmart), an emergency shutdown signal, or the absence of a system OK signal. To effect the change between the forward and reverse modes, the MCU 304 controls the switching of the transistors, e.g., by changing the duty cycle and/or switching frequency.

The MCU 304 performs calculations for the operations which can effectuate the reverse boosting mode, e.g., changing the duty cycle of the transistors (switch/rectifier pair) in the DC converting circuitry to increase the conversion ratio. The conversion ratio is the ratio between the input and output voltages. The required duty cycle to make the conversion ratio such that the reverse boosted voltage is higher than the panel voltage (which transitions the DC converting circuitry 306 and MPPT controller 304 to the reverse mode) may be calculated from the known solar panel voltage and the current inverter side voltage. The MCU 304 keeps increasing the conversion ratio (since the inverter voltage will keep dropping) until there is not sufficient power on the inverter side to sustain the reverse mode, i.e., until the power has been dissipated from the input capacitor. After burning off the energy from the inverter side, MCU 304 may disconnect the solar panel 310 via the disconnect 308 to complete the shutdown.

Further, the transition between reverse boost and forward buck mode may occur using a soft start approach, avoiding a surge current, or the transition may occur on a pulse-by-pulse basis. The MPPT controller 304 may also, for example, in the event of an emergency shutdown or absence of a system OK signal, disconnect the solar panel 310 via the disconnect 308 after the energy in the input capacitor has been dissipated in the photodiodes of the solar panel 310.

Figure 6:
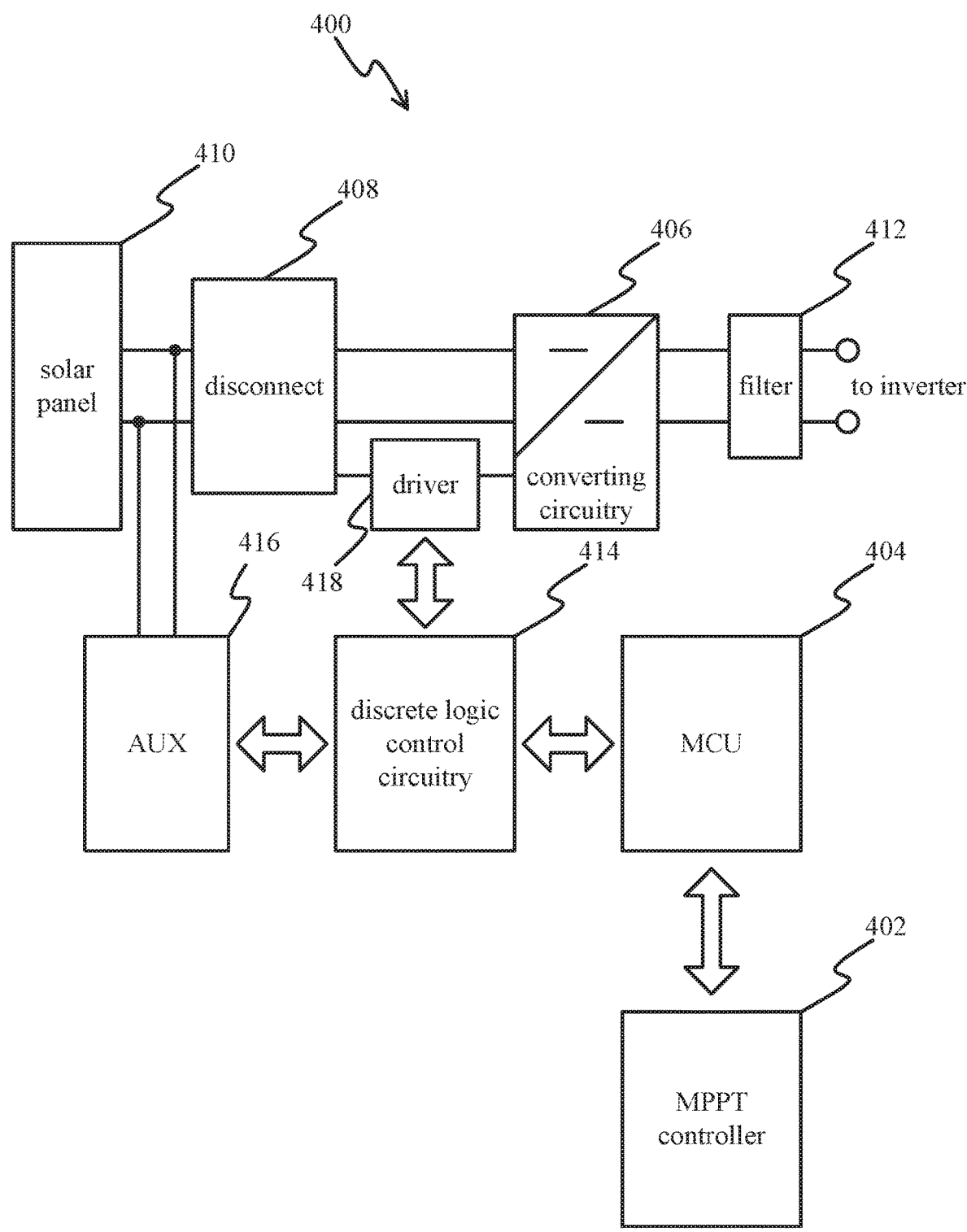
FIG. 6 is a schematic structural diagram illustrating a photovoltaic system including an MPPT controller according to some embodiments of the present disclosure.

FIG. 6 is a schematic structural diagram illustrating a photovoltaic system 400 for connecting to an inverter according to some embodiments of the present disclosure. The photovoltaic system 400 is a distributed system.

The photovoltaic system 400 includes an MPPT controller 402, an MCU 404, converting circuitry 406, and a solar panel 410 having one or more solar modules, which perform the same functions and are substantially similar to the MPPT controller 302, the MCU 304, the converting circuitry 306, and the solar panel 310 described hereinabove. The photovoltaic system 400 also includes a disconnect 408 and a filtering element 412, which perform the same functions and are substantially similar to the disconnect 308 and the filtering element 312 described hereinabove.

Auxiliary preloading unit 416 is configured to create a power supply in cases where the string is dead. It can also create power from the solar panel 410. In some embodiments, power may be fed from the filtering element 412.

The driver 418 provides power and level translation for switches in the disconnect 408 and the DC converting circuitry 406. The driver 418 is controlled via discrete logic control circuitry 414 by the MCU 404, which does the fine tuning, logic, and also synchronization control of the MPPT controller 402, and other communications. Triggering signals for emergency shutdown or to change between the forward buck mode and the reverse boost mode are generated by the MCU 404. The signals are sent to the driver 418 via the discrete logic control circuitry 414 to implement the actions via switching elements in the disconnect 408 and the DC converting circuitry 406 which are driven by the discrete logic control circuitry 414.

FIG. 7 is a schematic structural diagram illustrating a photovoltaic system 500 for connecting to an inverter according to some embodiments of the present disclosure.

The photovoltaic system 500 includes an MPPT controller 502, an MCU 504, and a solar panel 510 having one or more solar modules, which perform the same functions and are substantially similar to the MPPT controller 402, the MCU 404, and the solar panel 410 described hereinabove. The photovoltaic system 500 also includes an auxiliary preloading unit 516, a driver 518, and discrete logic control circuitry 514 which perform the same functions and are substantially similar to the auxiliary preloading unit 416, a driver 418, and discrete logic control circuitry 414 described hereinabove.

In the photovoltaic system 500, instead of the classic buck converter using one switch and one rectifier, two transistors 520 and 522 are used to enable synchronous rectification. Transistor 520 is the switch that charges an inductor 524. On release of transistor 520, transistor 522 catches the flyback of 524 and pushes the current through filtering element 512 to the inverter.

MOSFET transistors 532 and 534 are used to disconnect solar panel 510 after an emergency shutdown. Multiple MOSFET transistors may be used in parallel as a disconnect, so that the power through any one MOSFET is limited. Also, the photovoltaic system 500 may include reverse current diodes 536, plus components (not shown) inside solar panel 510 which are, essentially, for each component a diode in the forward direction. During an emergency shutdown, transistors 520 and 522 may be used as a boost converter, receiving the string voltage coming in at the inverter side through filtering element 512 and boosting that voltage into the solar panel 510 such that the photodiodes of the solar panel 510 may be used to dissipate that energy. Such a process typically will not heat the panel significantly or excessively, since panel efficiency in normal use is about 15% and panels are normally absorbing large amount of energy and thus a short time energy boost has no effect and typically will not damage the diodes.

Typically, the process of absorbing the energy from the inverter's capacitors will only last a short period of time, often only a few seconds to boost the voltage sufficiently to empty the capacitors when the voltage is sufficient. A typical panel has an output voltage of around 40 volts, which is equivalent to about 72 solar cells. Operated as diodes, they have a voltage drop of approximately 0.5 to 0.7 Volts, so a panel that has a nominal 40 Volt output would, at a voltage of approximately 40 to 50 Volts, consume the full power of the capacitors. As the transistors 520 and 522 are operated as a boost converter, with transistor 520 acting as a switch and transistor 522 acting as a rectifier, the current is reduced as the voltage is boosted. The solar modules can discharge all together or one at a time. As a solar module reaches 0 Volts, the switches at its output keep the output at 0 Volts, thus reducing the overall voltage in whole string accordingly. This approach enables the system to distribute the energy of the capacitors over most of the solar panels, thus discharging the capacitors very quickly.

To avoid damage to any part of the system, in some cases typically the reverse operation is tightly monitored, also to allow inverter input voltage to not drop too fast, so the inverter can perform a graceful grid disconnect. Further, a so-called soft start is employed (meaning a surge or inrush current is avoided by gently throttling the change). Also, in some cases monitoring enables the system to change between reverse boost and forward buck mode on a pulse-by-pulse basis, to support balancing within a string or also between strings. Also, in yet other cases, there may be a preset power dissipation limit per panel that may include additional information, including but not limited to panel and ambient temperature, sun irradiation, etc.

In some cases, a photovoltaic system connected to an inverter has an MPPT controller as part of the string supplying current to the inverter from the photovoltaic panels. Further, this MPPT controller contains a buck converter for reducing the voltage of the panels. It also has an MCU for communication and executing control programs, and controlling the buck converter to enable the string to operate at the MPPT point. The buck converter is software-configurable to operate as a reverse boost converter, enabling the system to draw energy out of the string and attached inverter and to dissipate energy in the photo diodes of the PV panel. In such cases, the controller may, based upon certain triggers, automatically change from forward buck mode to reverse boost mode to dissipate excess energy. These certain triggers may be an overvoltage condition, an emergency shutdown signal, or the absence of a system OK signal. Further, the change between reverse boost and forward buck mode may occur using a soft start approach, avoiding a surge current, or it may occur on a pulse-by-pulse basis.

Figure 8:
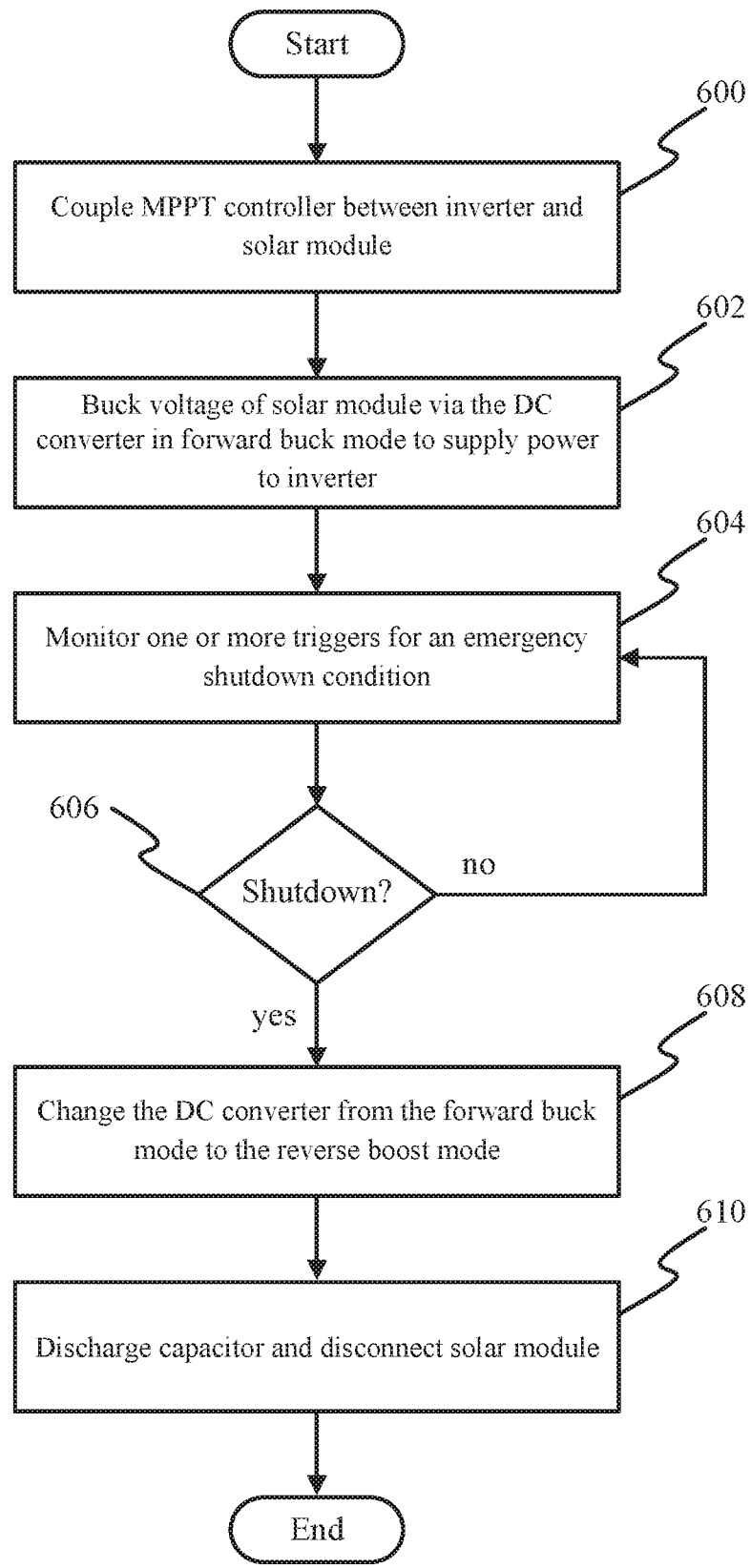
FIG. 8 is a schematic flowchart illustrating a process for transferring energy between at least one photovoltaic module and an inverter having an input capacitor according to some embodiments of the present disclosure.

FIG. 8 is a schematic flowchart illustrating a process for transferring energy between at least one photovoltaic module and an inverter having an input capacitor according to some embodiments of the present disclosure. The method of FIG. 8 can be implemented in the system of FIG. 5, 6 or 7, using the power flow control technique as discussed in FIGS. 4A and 4B, for inverters connected in various configurations, such as those illustrated in FIGS. 2 and 3A-3C.

A maximum power point tracking (MPPT) controller is coupled 600 between the input capacitor of the inverter and the at least one photovoltaic module.

The MPPT controller includes a direct current (DC) converter configured to reduce, in a forward buck mode, a voltage of the at least one photovoltaic module, to supply power from the at least one photovoltaic module to the input capacitor of the inverter. The DC converter is software-configurable to increase, in a reverse boost mode, a voltage of the input capacitor of the inverter, to dissipate power from the input capacitor in the at least one photovoltaic module.

The MPPT controller also includes a micro control unit (MCU) configured to control the DC converter to allow the at least one photovoltaic module to operate at a maximum power point. The MMPT controller may be configured according to any of the embodiments disclosed hereinabove.

The MCU drives the DC converter in the forward mode so that the voltage of the at least one photovoltaic module is bucked 602 via the DC converter in the forward buck mode to supply power to the input capacitor of the inverter.

The MCU monitors 604 one or more triggers for an emergency shutdown condition while the photovoltaic system is operating. The one or more triggers may include, for example, at least one of an overvoltage condition, an emergency shutdown signal, and an absence of a system OK signal.

The MCU determines 606, as a result of the monitoring, whether a trigger for an emergency shutdown condition has been met. If the MCU determines that an emergency shutdown trigger has been met, then the MCU continues to change 608 the operation of the converter. If the MCU determines that no emergency shutdown trigger has been met, then the MCU returns to monitor 604 triggers.

Upon a determination 606 by the MCU from the monitoring 604 that an emergency shutdown condition has been met, the MCU reconfigures the DC converter to change 608 from the forward buck mode to the reverse boost mode.

The MCU operates the DC converter in the reverse buck mode until the input capacitor to the inverter has been discharged 610. The MCU then disconnects 610 the solar module.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

When solar modules are connected in series or mesh configuration, there can be a problem in which weaker modules not only produce less energy but also affect other modules in the same string or wiring section. By measuring one can determine that a few modules are weaker than the others in most commercially installed strings. Thus, the string is generating less power than the sum available at each module if modules were operated separately.

At least one embodiment of the present disclosure provides methods and systems to switch on and off weak modules in the string in a way that the current on the string bus from the good modules won't be affected by the weak modules.

The present invention allows transmission of data from solar modules to a central (or system controller management) unit and other local management units in an energy production or photovoltaic system without adding significant cost. One embodiment of the present invention involves using the typically undesired electrical noise produced when operating local management units (sometimes referred to as "controllers" or "converters") to act as a carrier system for data to be transferred. As there are a multitude of solar modules, each can be run on a slightly different frequency. Such an approach allows a receiver in the energy production or photovoltaic system to identify the carrier signal of each local management unit separately. This approach has the added benefit of reducing the overall system noise, because each local management unit sends "noise energy" in a different part of the spectrum, thus helping to avoid peaks.

While certain embodiments have been described herein, these embodiments are presented by way of example only, and are not intended to limit the scope of the disclosure. Indeed, using the teachings in this disclosure, a person of ordinary skill in the art could modify and adapt the disclosure in various ways, making omissions, substitutions, and changes in the form of the embodiments described herein without departing from the spirit of the disclosure. The accompanying claims are intended to cover such forms or modifications as would fall within the scope and spirit of the disclosure.

What is claimed is:

1. A system, the system comprising:
   at least one photovoltaic module;
   a controller coupled between an input capacitor of an inverter and the at least one photovoltaic module, wherein the controller includes:
      a direct current (DC) converter configured to reduce, in a forward buck mode, a voltage of the at least one photovoltaic module, to supply power from the at least one photovoltaic module to the input capacitor of the inverter; and
      a microcontroller unit (MCU) configured to control the DC converter to allow the at least one photovoltaic module to operate at a maximum power point, and
   wherein the DC converter is software-configurable to increase, in a reverse boost mode, a voltage of the input capacitor of the inverter, to dissipate power from the input capacitor in the at least one photovoltaic module,
   wherein the controller is configured to, based upon one or more triggers associated with an emergency shutdown condition detected by the controller, automatically change the DC converter from the forward buck mode to the reverse boost mode to dissipate excess energy stored in the input capacitor,
   wherein the controller is further configured to change the buck converter from the forward buck mode to the reverse boost mode on a pulse-by-pulse basis based upon the one or more triggers associated with the emergency shutdown condition detected by the controller.

2. The system of claim 1, wherein a trigger of the one or more triggers is an overvoltage condition.

3. The system of claim 1, wherein a trigger of the one or more triggers is an emergency shutdown signal.

4. The system of claim 1, wherein a trigger of the one or more triggers is the absence of a system OK signal.

5. The system of claim 1,
   wherein the controller is disposed with the inverter,
   wherein the inverter is one of a central inverter, a string inverter, and a micro-inverter in photovoltaic array including one or more strings of photovoltaic modules.

6. The system of claim 1, further comprising:
   an emergency shutdown disconnect configured to electrically disconnect the at least one photovoltaic module from the photovoltaic system,
   wherein the emergency shutdown disconnect comprises one or more metal-oxide-semiconductor field-effect transistors (MOSFETs).

7. The system of claim 1, wherein the controller is further configured with a preset power dissipation limit for the at least one photovoltaic module.

8. The system of claim 7, wherein the preset power dissipation limit is based on at least one of a photovoltaic module temperature, an ambient temperature, and a solar irradiance.

9. The system of claim 1, wherein the DC converter includes at least one of a buck converter, a buck-boost converter, and a Ćuk converter.

10. A system, the system comprising:
    a controller coupled between an input capacitor of an inverter and at least one photovoltaic module, wherein the controller includes:
       a direct current (DC) converter configured to reduce, in a forward buck mode, a voltage of the at least one photovoltaic module, to supply power from the at least one photovoltaic module to the input capacitor of the inverter; and
       a microcontroller unit (MCU) configured to control the DC converter to allow the at least one photovoltaic module to operate at a maximum power point, and
    wherein the DC converter is software-configurable to increase, in a reverse boost mode, a voltage of the input capacitor of the inverter, to dissipate power from the input capacitor in the at least one photovoltaic module,
    wherein the controller is configured to, based upon one or more triggers associated with an emergency shutdown condition detected by the controller, automatically change the DC converter from the forward buck mode to the reverse boost mode to dissipate excess energy stored in the input capacitor,
    wherein the controller is further configured to change the buck converter from the forward buck mode to the reverse boost mode on a pulse-by-pulse basis based upon the one or more triggers associated with the emergency shutdown condition detected by the controller.

11. The system of claim 10, wherein a trigger of the one or more triggers is an overvoltage condition.

12. The system of claim 10, wherein a trigger of the one or more triggers is an emergency shutdown signal.

13. The system of claim 10, wherein a trigger of the one or more triggers is the absence of a system OK signal.

14. The system of claim 10, wherein the DC converter includes at least one of a buck converter, a buck-boost converter, and a Ćuk converter.

15. The system of claim 10,
wherein the controller is disposed with the inverter,
wherein the inverter is one of a central inverter, a string inverter, and a micro-inverter in photovoltaic array including one or more strings of photovoltaic modules.

16. A method, the method comprising:
coupling a controller between an input capacitor of an inverter and at least one photovoltaic module, wherein the controller includes:
a direct current (DC) converter configured to reduce, in a forward buck mode, a voltage of the at least one photovoltaic module, to supply power from the at least one photovoltaic module to the input capacitor of the inverter; and
a microcontroller unit (MCU) configured to control the DC converter to allow the at least one photovoltaic module to operate at a maximum power point,
wherein the DC converter is software-configurable to increase, in a reverse boost mode, a voltage of the input capacitor of the inverter, to dissipate power from the input capacitor in the at least one photovoltaic module;
bucking, as controlled by the MCU, the voltage of the at least one photovoltaic module to the inverter via the DC converter in the forward buck mode to supply power to the input capacitor of the inverter;
monitoring, by the MCU, one or more triggers for an emergency shutdown condition; and
changing, as controlled by the MCU, upon a determination by the MCU from the monitoring that the emergency shutdown condition has been met, the DC converter from the forward buck mode to the reverse boost mode, the changing being on a pulse-by-pulse basis based upon the one or more triggers for the emergency shutdown condition.

17. The method of claim 16, wherein the one or more triggers include at least one of an overvoltage condition, an emergency shutdown signal, and an absence of a system OK signal.

* * * * *